(12) United States Patent
Huang et al.

(10) Patent No.: US 12,530,567 B2
(45) Date of Patent: Jan. 20, 2026

(54) SPIKING CONVOLUTIONAL NEURAL NETWORK BASED ON FLASH STORAGE AND COMPUTING ARRAY

(71) Applicant: Peking University, Beijing (CN)

(72) Inventors: Peng Huang, Beijing (CN); Yachen Xiang, Beijing (CN); Jinfeng Kang, Beijing (CN); Xiaoyan Liu, Beijing (CN); Runze Han, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 1035 days.

(21) Appl. No.: 17/619,395

(22) PCT Filed: Dec. 18, 2019

(86) PCT No.: PCT/CN2019/126343
§ 371 (c)(1),
(2) Date: Dec. 15, 2021

(87) PCT Pub. No.: WO2021/027214
PCT Pub. Date: Feb. 18, 2021

(65) Prior Publication Data
US 2022/0414427 A1 Dec. 29, 2022

(30) Foreign Application Priority Data

Aug. 12, 2019 (CN) .......................... 201910741894.2

(51) Int. Cl.
*G06N 3/04* (2023.01)
*G06F 12/02* (2006.01)
*G06N 3/049* (2023.01)

(52) U.S. Cl.
CPC ......... *G06N 3/049* (2013.01); *G06F 12/0246* (2013.01)

(58) Field of Classification Search
CPC ...... G06N 3/049; G06N 3/065; G06N 3/0464; G06N 3/063; G06N 3/045; G06F 12/0246
See application file for complete search history.

(56) References Cited

U.S. PATENT DOCUMENTS 11,003,251 B2 * 5/2021 Kim ...................... A61B 5/7282
2015/0120632 A1 * 4/2015 Campos ................. G06N 3/049
706/44

(Continued)

FOREIGN PATENT DOCUMENTS

CN 103201610 A 7/2013
CN 104933722 A * 9/2015 ............... G06T 7/13

(Continued)

OTHER PUBLICATIONS

Roshan Gopalakrishnan, RRAM based neuromorphic algorithms, Jan. 12, 2019 (Year: 2019).*

(Continued)

*Primary Examiner* — Hassan Mrabi
(74) *Attorney, Agent, or Firm* — Scully, Scott, Murphy & Presser, P.C.

(57) ABSTRACT

A spiking convolutional neural network based on a FLASH storage and computing array, including: a sampling module, a FLASH-based storage and computing array and a corresponding neuron module, and a counter module; the sampling module is used to sample an input image to obtain an input spike; the FLASH-based storage and computing array stores a weight matrix, and is used to perform a vector matrix multiplying operation on the input spike and the weight matrix, and an operation result is output in a form of current; the neuron module is used to integrate the operation result of the FLASH-based storage and computing array so as to generate an output spike; the counter module is used to count a number of spikes generated by the neuron module of (Continued)

an output layer, and determine the number of spikes of the neuron module with a largest number of spikes as a recognition result.

9 Claims, 3 Drawing Sheets

(56) References Cited

U.S. PATENT DOCUMENTS

| | | | | |
|---|---|---|---|---|
| 2016/0358069 | A1* | 12/2016 | Brothers | G06F 7/764 |
| 2017/0200078 | A1* | 7/2017 | Bichler | G06N 3/045 |
| 2018/0157969 | A1 | 6/2018 | Xie et al. | |
| 2018/0174024 | A1* | 6/2018 | Lin | G06N 3/063 |
| 2018/0174028 | A1* | 6/2018 | Lin | G06N 3/04 |
| 2018/0174053 | A1* | 6/2018 | Lin | G06N 3/049 |
| 2019/0156201 | A1* | 5/2019 | Bichler | G06N 3/049 |
| 2020/0026995 | A1* | 1/2020 | Buchanan | G06N 3/049 |
| 2020/0104717 | A1* | 4/2020 | Alistarh | G06N 3/045 |
| 2020/0210807 | A1* | 7/2020 | Lorrain | G06N 3/049 |
| 2021/0232897 | A1* | 7/2021 | Bichler | G06N 3/049 |
| 2023/0259749 | A1* | 8/2023 | Mangalore | G06N 3/0495 706/27 |
| 2023/0350858 | A1* | 11/2023 | Karr | G06F 3/064 |

FOREIGN PATENT DOCUMENTS

| | | | |
|---|---|---|---|
| CN | 108805270 A | 11/2018 | |
| CN | 108985447 A | 12/2018 | |
| CN | 109460817 A | 3/2019 | |
| CN | 109800876 A | 5/2019 | |
| CN | 109816026 A | 5/2019 | |
| CN | 110543933 A | 12/2019 | |
| JP | 2618470 B2 * | 6/1997 | ............ 706/25 |
| WO | 2019020384 A1 | 1/2019 | |

OTHER PUBLICATIONS

International Search Report dated May 12, 2020 issued in PCT/CN2019/126343.
Wang, Yan et al., "Image Segmentation Method Based on Improved Pulse Coupled Neural Networks", Computer Science (Jul. 2019), vol. 46, No. 7, pp. 259-262, with English-language Abstract.
Han, R.Z. et al., "A Novel Convolution Computing Paradigm Based on NOR Flash Array with High Computing Speed and Energy Efficient", IEEE International Symposium on Circuits and Systems (2018), with English-language Abstract.

* cited by examiner

SPIKING CONVOLUTIONAL NEURAL NETWORK BASED ON FLASH STORAGE AND COMPUTING ARRAY

CROSS-REFERENCE TO RELATED APPLICATION

This application is the national phase under 371 of PCT Application No. PCT/CN2019/126343, filed Dec. 18, 2019, which claims priority to Chinese Application No. 201910741894.2, filed on Aug. 12, 2019, incorporated herein by reference in their entirety.

TECHNICAL FIELD

The present disclosure relates to a field of semiconductor devices and integrated circuits, in particular to a spiking convolutional neural network based on a FLASH storage and computing array.

BACKGROUND

Deep learning has achieved great success in image processing and speech recognition, and has been widely used in fields such as autonomous driving and security monitoring. As an important part of deep learning, a performance improvement of convolutional neural network is of great significance to a further development of deep learning. A storage and computing-integrated array (storage and computing array) designed based on FLASH can execute matrix vector multiplication in parallel and realize an integration of storage and computing, so as to accelerate operations at a hardware level. However, a similar storage and computing-integrated structure may introduce new problems, that is, an extra and huge hardware overhead caused by peripheral circuits, especially analog-to-digital/digital-to-analog converters.

SUMMARY

According to an aspect of the present disclosure, there is provide a spiking convolutional neural network based on a FLASH storage and computing array, including: a sampling module, a FLASH-based storage and computing array and a corresponding neuron module for the FLASH-based storage and computing array, and a counter module;

the sampling module is configured to sample an input image so as to obtain an input spike;

the FLASH-based storage and computing array stores a weight matrix and is configured to perform a vector matrix multiply operation on the input spike and the weight matrix, and an operation result is output in a form of current;

the neuron module is configured to integrate the operation result of the FLASH-based storage and computing array, so as to generate an output spike;

the counter module is configured to count a number of spikes generated by the neuron module of an output layer, and determine the number of spikes of the neuron module with a largest number of spikes as a recognition result.

In order to make the above objectives, features and advantages of the present disclosure more apparent, preferred embodiments accompanied with accompanying drawings are described in detail below.

BRIEF DESCRIPTION OF THE DRAWINGS

In order to more clearly illustrate the technical solutions in the embodiments of the present disclosure, the drawings required in the description of the embodiments are briefly introduced below. It should be understood that the following drawings only show some embodiments of the present disclosure, and therefore should not be considered as limiting the scope. For those ordinary skilled in the art, other related drawings may be obtained from these drawings without inventive effort.

FIG. 2(b) shows a convolutional layer and a pooling layer based on a FLASH storage and computing array.

DETAILED DESCRIPTION OF EMBODIMENTS

In the present disclosure, a number of spikes represents specific numerical information, that is, input and output of each layer in a convolutional neural network are expressed in binary (1/0). Such a hardware implementation may convert an intermediate value of each layer of the convolutional neural network into binary, so that an analog-to-digital/digital-to-analog converter may be eliminated, which may effectively solve a hardware overhead caused by peripheral circuits, and simplify a hardware implementation of a storage and computing-integrated structure.

In order to make objectives, technical solutions and advantages of the present disclosure more apparent, the present disclosure will be further described in detail below in connection with specific embodiments and with reference to the drawings. Some but not all of these embodiments will be shown. In fact, various embodiments of the present disclosure may be implemented in a plurality of different forms, and should not be construed as being limited to the embodiments described herein. In a case of no conflict, the embodiments in the present disclosure and the features in the embodiments may be combined with each other.

A first embodiment of the present disclosure provides a spiking convolutional neural network based on a FLASH storage and computing array. The convolutional neural network may include an input layer, a plurality of hidden layers, and an output layer. The plurality of hidden layers may include: a plurality of convolutional layers, a plurality of pooling layers, and a fully connected layer or a plurality of fully connected layers. The convolutional layer and the pooling layer may perform a feature extraction and a feature compression on input data. The fully connected layer may process a feature image extracted by the convolutional layer and the pooling layer, and output a classification result or a recognition result.

Figure 1:
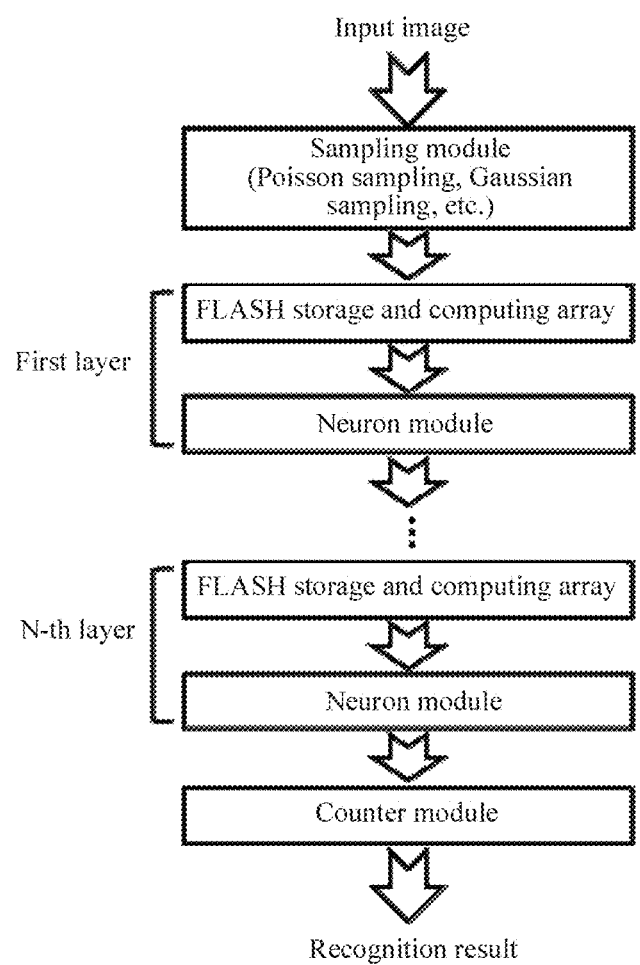
FIG. 1 shows a schematic structural diagram of a spiking convolutional neural network based on a FLASH storage and computing array according to some embodiments of the present disclosure.

The embodiments of the present disclosure provide a spiking convolutional neural network based on a FLASH storage and computing array. As shown in FIG. 1, the spiking convolutional neural network includes a sampling module, a plurality of layers of FLASH-based storage and computing arrays and corresponding neuron modules, and a counter module.

The sampling module may sample an input image. The input image may be sampled by using Poisson sampling or Gaussian sampling, so as to obtain a binary input spike.

Each layer of the FLASH-based storage and computing array and the corresponding neuron module may correspond to a layer of the convolutional neural network. That is, the FLASH-based storage and computing array and the corresponding neuron module may be an input layer, a convolutional layer, a pooling layer, a fully connected layer and an output layer. Each layer of the FLASH-based storage and computing array may receive the output spike of the neuron module of an upper layer, and the output spike of the neuron module of the layer may be used as an input of the FLASH-based storage and computing array of a lower layer.

The FLASH-based storage and computing array may perform a vector matrix multiply operation on the input spike and a weight matrix stored in the storage and computing array, so as to perform operations of convolution, pooling and full connection at the hardware level, and an operation result may be output in the form of current.

The neuron module may integrate the operation result (current) of the FLASH-based storage and computing array of the same layer. When an integrated voltage exceeds a preset threshold, a spike generation circuit may be triggered to generate a spike. The neuron module may output a spike, and then the integrated voltage of the neuron module may be reset to an initial state. When the integrated voltage does not exceed the preset threshold, the spike generation circuit may not be triggered, and the neuron module may not output a spike. The neuron module may generate a spike sequence (1/0) as the output spike through the method described above, and also as the input spike of the FLASH-based storage and computing array of the lower layer.

Each node of the output layer may include a counter module, that is, each neuron module serving as the output layer is connected to a counter module. The counter module may count and record the number of spikes generated by the neuron module of each output layer during the entire recognition process. Since a single sampling cannot ensure an integrity of the input image sampling, the spiking convolutional neural network based on the FLASH storage and computing array of this embodiment may be used to perform multiple recognitions, that is, a process of sampling-computing-integration may be performed for multiple times during the entire recognition process. At an end of the recognition process, the counter module of the output layer may compare the number of spikes generated by the neuron module of each output layer, and the number of spikes output by the neuron module with the largest number of spikes is determined as the recognition result.

Figure 2:
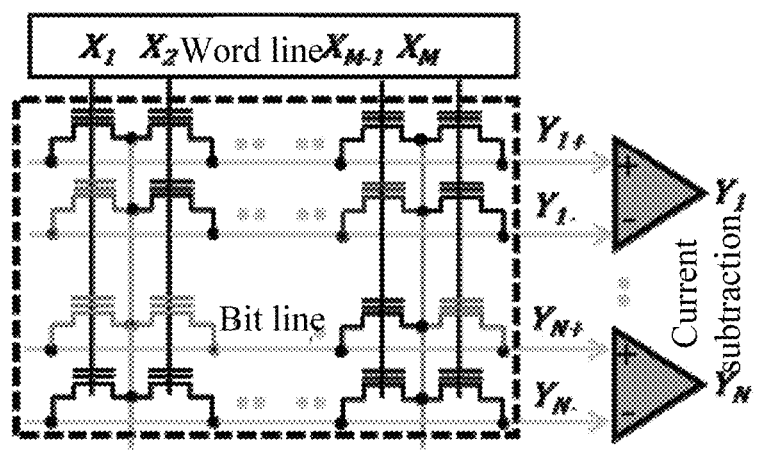
FIG. 2 (a) shows a fully connected layer based on a FLASH storage and computing array.
Figure 2:
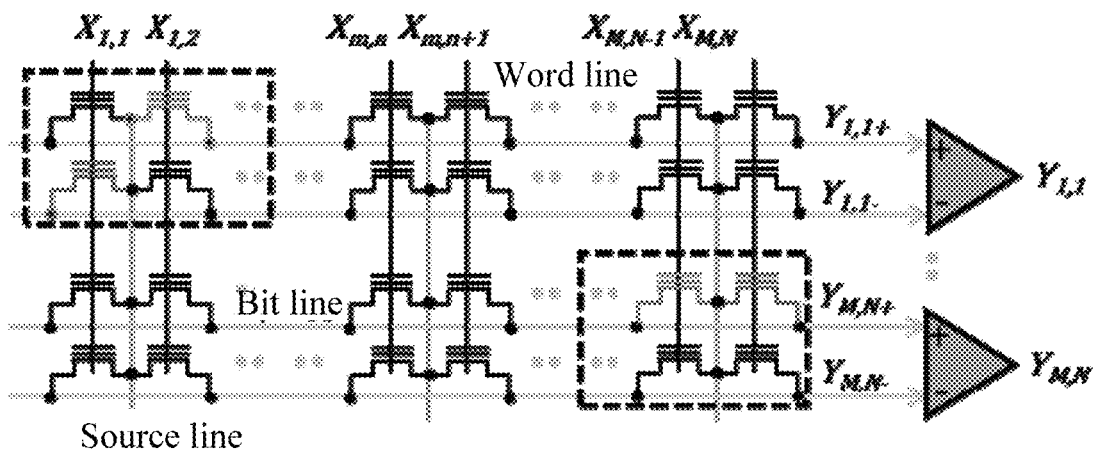

As shown in FIG. 2, the FLASH-based storage and computing array includes a plurality of FLASH units, a plurality of word lines, a plurality of source lines, a plurality of bit lines, and a plurality of subtractors.

The plurality of FLASH units may form a storage and computing array. Gate electrodes of each column of the FLASH units are connected to the same word line, source electrodes of each column of the FLASH units are connected to the same source line, and drain electrodes of each row of the FLASH units are connected to the same bit line.

A number of the word lines may correspond to a number of columns in the storage and computing array. The input spikes are input to the FLASH units through the word lines.

A number of the source lines may correspond to the number of columns of the storage and computing array. The source lines are all connected to a fixed driving voltage $V_{ds}$, which is applied to the source electrodes of the FLASH units.

A number of the bit lines may correspond to a number of rows in the storage and computing array. The bit lines are used to output signals of the drain electrodes of the FLASH units. Each row of bit lines may superimpose the drain signal of each FLASH unit in the row, and the superimposed drain signal may be output as an output signal. That is, the drain electrodes of each row of FLASH units are connected to the same bit line, and a total current value on the bit line is a sum of output value of each FLASH unit in the row.

FIG. 2 (a) shows the FLASH-based storage and computing array of the fully connected layer. The input spikes (1/0) are input to the word lines in the form of voltage, and are multiplied by the weight matrix stored in the FLASH storage and computing array and then accumulated, so as to generate a sum current along the bit line. FIG. 2 (b) shows the FLASH-based storage and computing array of the convolutional layer and the pooling layer. k×k convolution kernels are stored in k×k FLASH units on every two adjacent bit lines. Such an operation has an advantage that parallel calculations may be performed, and results of convolution or pooling operations may be directly read from the bit lines at one time.

A threshold voltage of the FLASH unit may be set by programming and erasing. When programming the FLASH unit, hot electrons are injected and the threshold voltage of the FLASH unit increases, then a storage state of the FLASH unit is determined as "0", that is, data "0" is stored in the FLASH unit. When erasing the FLASH unit, electrons tunnel and the threshold voltage of the FLASH unit decreases, then the storage state of the FLASH unit is determined as "1", that is, data "1" is stored in the FLASH unit. Therefore, by programming and erasing the FLASH unit, data "0" and data "1" may be stored in the FLASH unit. By converting weights in the weight matrix of the convolutional neural network into binary numbers, using the FLASH unit with the storage state "0" to represent the "0" in the binary weight, and using the FLASH unit with the storage state "1" to represent the "1" in the binary weight, the weight matrix may be represented by the storage and computing array including a plurality of FLASH units.

In the FLASH-based storage and computing array of this embodiment, the source lines of the FLASH units are all connected to a fixed driving voltage $V_{ds}$. The input spike is input to the FLASH unit via the word line. For the "0" in the input spike, 0 voltage is applied to the gate electrode of the FLASH unit through the word line. In this case, a ratio of a drain output current of the FLASH unit to a reference current is 0, and the drain output current is a product of the "0" in the input spike and the data stored in the FLASH unit ("0" or "1"). For the "1" in the input spike, $V_g$ is applied to the gate electrode of the FLASH unit through the word line, and the drain output current of the FLASH unit is "1", which is the product of the "1" in the input spike and the data stored in the FLASH unit. The drain electrodes of a plurality of FLASH units are connected together to output, and the "sum current" reflects a result of multiplication of input vectors and the matrix stored in the FLASH array, so that the matrix vector multiply operation is achieved.

Each row of bit lines may superimpose the drain signal of each FLASH unit in the row, and the superimposed drain signal "sum current" is output as the output signal, that is, the total current value on the bit line is a sum of the output signal of each FLASH unit in the row, which reflects a result of multiplying the input vectors and the weight matrix stored in the FLASH storage and computing array.

Figure 3:
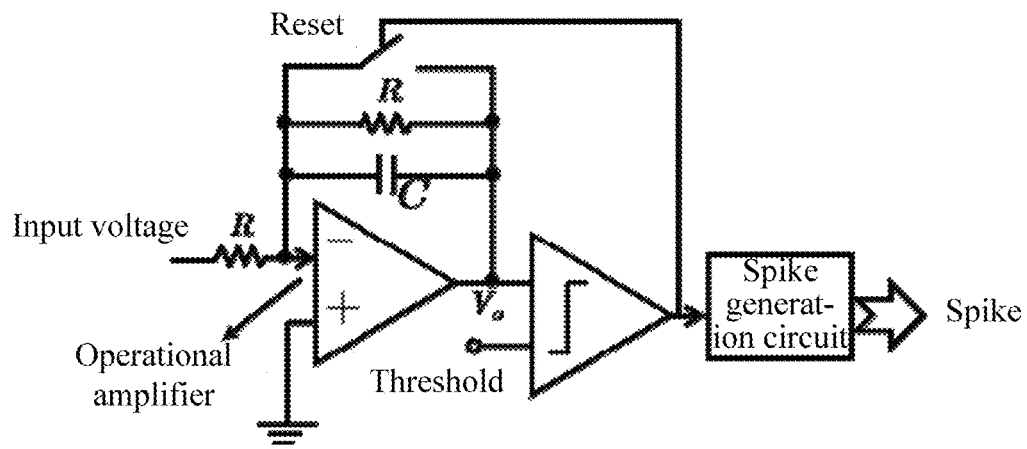
FIG. 3 shows a schematic structural diagram of a neuron module.

As shown in FIG. 3, the neuron module includes: an operational amplifier, a comparator, a spike generation circuit, a reset switch, an input resistor, an integrating capacitor, and a parallel resistor.

Each neuron module corresponds to a subtractor of the FLASH-based storage and computing array. The operational amplifier has a negative terminal connected to an output terminal of the subtractor through the input resistor, and a positive terminal grounded. The reset switch, the parallel resistor and the integrating capacitor are connected in parallel between the negative terminal and an output terminal of the operational amplifier. The output terminal of the operational amplifier is connected to one input terminal of the comparator. The preset threshold value may be input into the other input terminal of the comparator, and an output terminal of the comparator is connected to the reset switch and the spike generation circuit.

The current output by the subtractor of the FLASH-based storage and computing array is input to the operational amplifier, and the current is integrated by the integrating capacitor. The comparator may compare the output voltage obtained by integration with the preset threshold voltage. If the output voltage exceeds the threshold voltage, the comparator may trigger the spike generation circuit to output spikes, and the reset switch may be triggered by a feedback of the comparator to set the neuron module to the initial state. If the output voltage does not exceed the threshold voltage, the comparator may not trigger the spike generation circuit, and the spike generation circuit may not output spikes.

Figure 4:
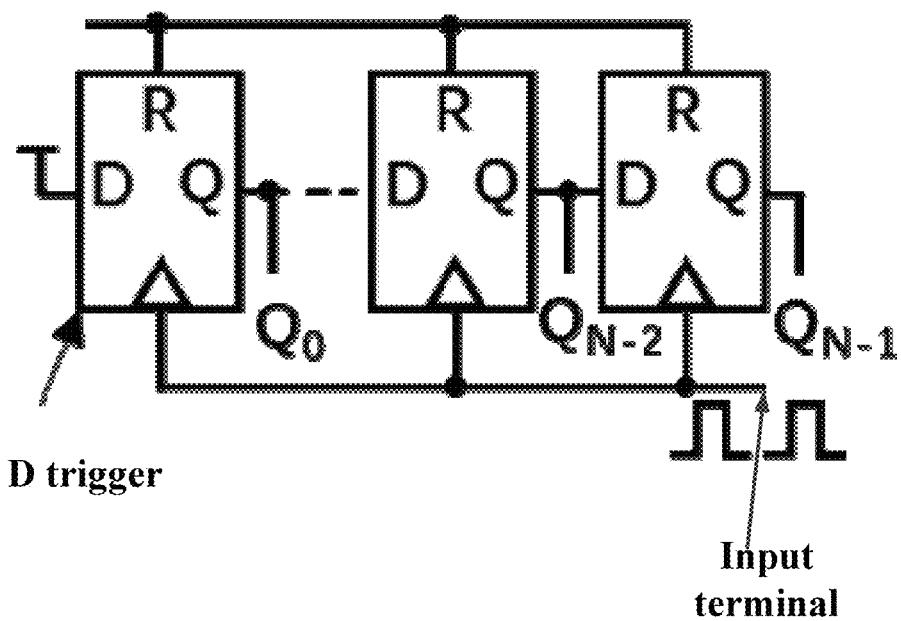
FIG. 4 shows a schematic structural diagram of a counter module.

FIG. 4 shows the counter module including N-bit shift registers. The counter module has an input terminal connected to the spike generation circuit of the neuron module of the output layer so as to receive spikes output by the spike generation circuit, and output terminals $Q_0, \ldots, Q_{N-2}, Q_{N-1}$. The counter of each neuron module may count the number of spikes output by the neuron module, and the number of output spikes corresponding to the neuron module with the largest number of output spikes is the recognition result of the neural network.

The above detailed description has explained a number of embodiments by using schematic diagrams, flowcharts and/or examples. In a case that such schematic diagrams, flowcharts and/or examples contain one or more functions and/or operations, those skilled in the art should understand that each function and/or operation in such schematic diagrams, flowcharts or examples may be implemented individually and/or together through various structures, hardware, software, firmware or substantially any combination thereof.

Unless there are technical obstacles or contradictions, the various embodiments of the present disclosure described above may be freely combined to form additional embodiments, and these additional embodiments are all within the protection scope of the present disclosure.

Although the present disclosure is described with reference to the drawings, the embodiments disclosed in the drawings are for illustrative purposes only and are not to be construed as limiting the present disclosure. Size ratios in the drawings are only schematic and should not be construed as limiting the present disclosure.

Although some embodiments according to a general concept of the present disclosure have been illustrated and described, it should be understood by those ordinary skilled in the art that these embodiments may be changed without departing from the principle and spirit of the general concept of the present disclosure. The scope of the present disclosure is defined by the claims and their equivalents.

What is claimed is:

1. A spiking convolutional neural network based on a circuit-based FLASH storage and computing array, comprising: a FLASH-based storage and computing array in each layer of the spiking convolutional neural network and a corresponding neuron module for the FLASH-based storage and computing array, and a counter module;

the FLASH-based storage and computing array stores a weight matrix and is configured to perform a vector matrix multiplying operation on the input spike and the weight matrix, and an operation result is output in a form of current;

the neuron module is configured to integrate the operation result of the FLASH- based storage and computing array so as to generate an output spike;

the spiking convolutional neural network comprises an input layer, a plurality of hidden layers and an output layer, an input spike of the input layer is obtained by sampling an input image, an output spike of the input layer and each hidden layer is used as an input spike of the FLASH-based storage and computing array in a lower layer, and an output spike of the output layer is used as an input of the counter module;

the counter module is configured to count a number of spikes generated by the neuron module of the output layer, and determine the number of spikes of the neuron module with a largest number of spikes as a recognition result;

wherein the FLASH-based storage and computing array comprises a plurality of FLASH units, a plurality of word lines, a plurality of source lines, a plurality of bit lines, and a plurality of subtractors;

in the storage and computing array including the plurality of FLASH units, gate electrodes of each column of the plurality of FLASH units are connected to the same word line, source electrodes of each column of the plurality of FLASH units are connected to the same source line, and drain electrodes of each row of the plurality of FLASH units are connected to the same bit line; each of the plurality of subtractors has a positive terminal and a negative terminal connected to two adjacent bit lines of the plurality of bit lines, respectively, wherein each of the plurality of source lines is connected to a fixed driving voltage, a first threshold voltage of each FLASH unit is set by programming and erasing to convert weight values in the weight matrix of the spiking convolutional neural network into binary numbers, wherein hot electrons are injected when programming to increase the first threshold voltage of a corresponding FLASH unit, and electrons tunnel when erasing to decrease the first threshold voltage of the corresponding FLASH unit;

wherein the neuron module comprises an operational amplifier, a comparator, a spike generation circuit, a reset switch, an input resistor, a parallel resistor and an integrating capacitor, wherein the operational amplifier has a negative terminal connected to an output terminal of a corresponding subtractor through the input resistor, the operational amplifier has a positive terminal grounded, the reset switch, the parallel resistor and the integrating capacitor are connected in parallel between the negative terminal of the operational amplifier and an output terminal of the operational amplifier, the output terminal of the operational amplifier is connected to a first input terminal of the comparator, a second threshold voltage is input into a second input terminal of the comparator, and an output terminal of the comparator is connected to the reset switch and the spike generation circuit;

the integrating capacitor is configured to integrate the operation result;

the comparator is configured to:
compare an output voltage obtained by integration with the second threshold voltage;
trigger the spike generation circuit to output a spike, and trigger the reset switch by a feedback of the comparator so as to set the neuron module to an initial state, in response to the output voltage exceeding the second threshold voltage; and
not trigger the spike generation circuit so that the spike generation circuit does not output a spike, in response to the output voltage not exceeding the second threshold voltage;
wherein the counter module is composed of an N-bit shift register, an input terminal of the counter module is connected to the spike generation circuit to receive spikes output by the spike generation circuit.

2. The spiking type convolutional neural network according to claim 1, wherein the input spike is obtained by sampling the input image using Poisson sampling or Gaussian sampling.

3. The spiking convolutional neural network according to claim 1, wherein,
a number of the word lines corresponds to a number of columns in the storage and computing array, and the input spike is input to the FLASH units through the word lines;
a number of the source lines corresponds to the number of columns in the storage and computing array;
a number of the bit lines corresponds to a number of rows in the storage and computing array, each row of the bit lines superimposes drain signal of each FLASH unit in said each row, and a superimposed drain signal is output as an output signal.

4. The spiking convolutional neural network according to claim 1, wherein the FLASH unit stores a weight value of the convolutional neural network, and the FLASH-based storage and computing array stores a weight matrix of the convolutional neural network.

5. The spiking convolutional neural network according to claim 4, wherein in response to programming the FLASH unit, a storage state of the FLASH unit is determined as "0"; and in response to erasing the FLASH unit, the storage state of the FLASH unit is determined as "1".

6. The spiking type convolutional neural network according to claim 4, wherein the FLASH unit on the bit line connected to the positive terminal of the subtractor stores a positive weight value, and the FLASH unit on the bit line connected to the negative terminal of the subtractor stores a negative weight value.

7. The spiking convolutional neural network according to claim 1,
wherein the plurality of hidden layers comprise a plurality of convolutional layers, a plurality of pooling layers, and a fully connected layer or a plurality of fully connected layers.

8. The spiking convolutional neural network according to claim 7, wherein a node of at least one of the input layer, the convolutional layer, the pooling layer, the fully connected layer, and the output layer comprises: the FLASH-based storage and computing array and the corresponding neuron module.

9. The spiking convolutional neural network according to claim 8, wherein the neuron module of each node of the output layer is connected to one counter module.

* * * * *